UNITED STATES PATENT OFFICE.

WILLIAM THUM, OF HAMMOND, INDIANA, ASSIGNOR TO UNITED STATES METALS REFINING CO., OF NEW YORK, N. Y., A CORPORATION OF NEW JERSEY.

PROCESS FOR SEPARATING BISMUTH FROM COPPER.

1,098,854.

Specification of Letters Patent.

Patented June 2, 1914.

No Drawing.

Application filed September 17, 1910. Serial No. 582,434.

*To all whom it may concern:*

Be it known that I, WILLIAM THUM, a citizen of the United States, and a resident of Hammond, in the county of Lake and State of Indiana, have invented certain new and useful Improvements in Processes for Separating Bismuth from Copper, of which the following is a specification.

The invention relates to a process for the separation of bismuth from copper, whereby both metals are brought into condition for further refining to pure metals; and particularly to a process in which the bismuth is reduced to metal and the copper converted into sulfid (copper matte) with the formation of a suitable slag.

It has for its object a cheap and effective method for the separation of bismuth from copper, particularly from oxidized products of these metals.

The process is particularly adapted for the recovery of the smaller or larger amount of bismuth contained in many grades of Western and foreign lead bullion, as it affords means to extract the metal bismuth from such by-products obtained in the refining treatment of the bullion. It is further directly applicable for bismuth bearing refuse material; by-products; oxid slags, such as slags derived from furnace treatment of bismuth bearing copper, or the flue dust of copper converters and furnaces carrying appreciable quantities of bismuth; or from anode slimes from electrolytic lead refining from which the antimony, arsenic and lead have been cupeled or slagged off in the usual manner as lead antimonite and antimonate or arsenite and arsenate of lead; or, in short, from any material showing a concentration of bismuth in the presence of copper.

The process is based upon the fact that sulfur has a much greater affinity for copper than for bismuth; and the treatment is such that bismuth is produced in the state of crude metal containing but small amounts of copper, and the copper in combination with sulfur as sulfid (copper matte) containing but very small amount of bismuth, together with the formation of a readily removable slag. The crude bismuth and the copper matte thus obtained are in excellent condition for further treatment and refinement. I prefer to cast the crude bismuth into suitable anodes which are then treated electrolytically in any suitable manner, as for example by the apparatus disclosed in my co-pending U. S. application, Serial No. 529,181, filed Nov. 20th, 1909. The copper sulfid is treated in the usual manner for the recovery of refined copper.

In carrying out my process I proceed as follows: Any product containing principally bismuth and copper is first preferably brought to the oxidized state in any suitable manner, as in that condition it can more readily be reduced to the desired fineness by means of crushing apparatus and more intimately mixed with the other ingredients required. As an example of the oxid slag of a heavy metal I may mention the oxid of lead, obtained in oxidizing fusion of lead and known as "litharge." A convenient size to which to reduce the oxid slag is that obtained by screening the crushed material through a screen having four meshes to the linear inch, but a still finer mesh may be used. The charge is then made up by mixing the crushed material (oxid slag) intimately with finely crushed alkali-sulfur compound such as the sulfid, or preferably the sulfate, of an alkali. I prefer, however, to employ the sulfate such as sodium sulfate (known as salt cake—$Na_2SO_4$) and to reduce the same to sulfid during the furnace operation of the process by a suitable reducing agent such as charcoal, coal screenings, coke breeze or other fine carbonaceous material. A sulfate, especially sodium sulfate, is preferred for the reason that the sulfids of the alkali metals are deliquescent salts and rather dangerous in this connection, causing frequent explosions upon contact with molten masses; also, because sodium sulfid melts more readily than sodium sulfate. This latter feature is not desirable, as the fusion of the alkali compounds should occur approximately simultaneously with the reduction, fusion and other reactions of the furnace charge. Furthermore, sodium sulfate is a material which may be procured very cheaply, being a by-product of the manufacture of acid works. The amount of carbon and salt cake added are largely in excess of what would be needed to reduce, first—the sodium sulfate to sodium sulfid, and then all the oxids to the metallic state. The sulfur in the salt cake, also, is largely in excess of the quantity required to convert all the copper into a copper sulfid.

It is evident that the direct mixing and smelting of the metallic oxids and sodium sulfid will produce a similar final result, viz: crude metallic bismuth and copper matte; although for the above reasons the use of sulfate with reducing material is preferred. Any silica or alumina present in combination with the metal oxid, will, of course, combine with the sodium and must be accounted for by an excess of this powerful base. It is to be further noted that large amounts of silica are deleterious to the process, and the presence of silica in any considerable quantity is not anticipated.

The operations are conducted without difficulty if the amount of the smelting ingredients added is at least two and one-half times the quantity as indicated by the theory for reduction and conversion of metals and salts, as aforesaid.

Following are some examples of the actual amount of carbon and salt cake I prefer to add with given percentages of copper contained as oxid, assuming that the bulk of the balance of the oxids consist of bismuth oxid:

| | Salt cake. | Carbon. |
|---|---|---|
| 10% copper | 27.5% of the weight of slag. | 18% of the weight of slag. |
| 20% copper | 55% of the weight of slag. | 25% of the weight of slag. |
| 30% copper | 82% of the weight of slag. | 35% of the weight of slag. |

The so prepared charge can be smelted either in a blast furnace or a reverberatory furnace; but I prefer the latter, provided with a cupeling breast that can be scraped down to follow the level of charge. I also prefer to use an oil fired furnace on account of the ease with which necessary changes in temperature are effected. The material is charged on the hearth of the reverberatory and is smelted down, the batches of mixture being added in easy stages. The heat is adjusted so as to keep the whole fused mass in a perfectly liquid state, care being taken not to let the temperature decrease to a point where chilling under the slag or at the bottom of the furnace can take place. The proper degree of temperature is between 2500° F. and 3000° F. The operation is finished when the bath ceases to boil or to emit the gases such as CO, etc. There are then in the furnace three distinct layers of products, the top layer consisting of soda slags, being a mixture of sodium sulfid, sodium sulfate, or caustic soda, etc. Under the slag cover there is a layer of copper sulfid (copper matte), and at the bottom nearly all the bismuth has collected in the metallic state.

If silver and gold were present in the original material, approximately 80% of the silver and nearly all of the gold is found in the collected bismuth metal, and are subsequently recovered in the electrolysis of the bismuth. The rest of the silver will be practically all found in the copper matte, very small amounts being also held mechanically in the soda slags.

Any arsenic or antimony contained in the original material will be found in the soda slags combined as arsenite or arsenate of soda, or as antimonite or antimonate of soda. Any traces of arsenic or antimony going over to the crude bismuth metal will be entirely eliminated by the electrolytic treatment.

Any tellurium present will be found practically all combined with the copper, forming a mixture of sulfid and tellurid of copper; and, if any lead has been present or has been insufficiently removed by the usual cupeling process of lead and antimony from the original bismuth-copper slag, the same will be found to the extent of approximately 40% of the total amount of lead, in the soda slags, approximately 10% of the total lead in the copper sulfid, and approximately 50% of the total lead in the crude bismuth metal. Lead in the metal will be eliminated by the subsequent electrolytic treatment of the bismuth. After the melted mass has ceased boiling, as described above, it is proper to lower the heat. The slags are then tapped or skimmed over the breast of the furnace into conical pots or molds and are, after cooling, easily separated from any copper matte that may have come over with the slags. After having removed the slag, the heat supply, such as the flame from an oil burner, can be cut out, and the bath allowed to cool for ten minutes to half-an-hour. The copper matte is then tapped or skimmed off as rapidly as possible into conical pots in the same manner as the slag. The heat is now again raised, by setting into operation the flow of fuel oil through the burner, the remainder of the liquid bath of metal, in the furnace, consisting now chiefly of bismuth with the larger part of the silver and gold that was present in the original material and small percentages of impurities such as copper and lead. At this stage it is useful to make a quick colorimetric test for copper on a small chilled sample of the metal taken from the furnace.

If it is found that the copper has been eliminated to about 1% and no large amounts of silver and gold have been present in the original material treated, the crude bismuth metal can be cast into anodes for subsequent electrolytic refining treatment. In case the copper exceeds approximately 1%, the metal can again be oxidized to oxid slag by contact with air, which I prefer to supply through iron pipes inserted under the surface of the bath, under a pressure of from six to ten pounds to the square inch. The air blowing is started at a low external heat, the oxidation of the metals producing most of the heat necessary to keep the bath in molten condition. The formation of the oxid slag will progress slowly in the beginning but quite rapidly in the latter stages of this operation. The oxids of bismuth and copper so formed are continuously run over the cupel breast of the furnace by scraping the breast down below the level of the furnace bath in the usual manner. The oxids thus obtained are then again crushed and subjected to the treatment with salt cake and carbon until the reduced metal is sufficiently pure for subsequent refining treatment.

If the anode bismuth metal obtained in the first operation contains one or more per cent. of silver and gold, it is evident that the second oxidation treatment, as described above, would be recommendable for economical reasons; for, by cutting off the oxidizing operation at the point when very little of the bismuth metal remains unoxidized nearly the whole of the silver and gold can be separated in the shape of a very rich silver-gold-bismuth bullion from the bismuth oxid slag, by skimming or tapping this bismuth slag off to the level of the molten silver and gold metals which do not oxidize at all, or only to a very slight degree. While the subsequent refining treatment would separate the silver and gold, these high values would be tied up longer in process than necessary, and I therefore prefer to liberate them in the furnace operations of my process.

Of course, I do not restrict myself to any proportions of salt cake and carbon nor of sulfid, but I have found that an excess of the sodium compound and the carbon is highly beneficial in protecting the metal bath against metal losses by volatilization. There is no danger of any over reduction, as the whole operation of separating the bismuth into metal and the copper into matte, with an excess of alkali-sulfur-compound in the slag, will take place without difficulty if conducted in the manner above described.

I will further state that I do not restrict myself to the use of sodium sulfid or sulfate, as the potassium compounds would act in a similar manner, but sodium sulfate recommends itself on account of its low price as well as for other reasons, as set forth.

I claim:—

1. The herein disclosed process for the separation of bismuth and copper, which consists in reducing the bismuth copper product, consisting chiefly of bismuth and copper, to a fine state, intimately mixing therewith a suitable compound containing combined sulfur, smelting said mixture to provide crude bismuth and copper matte, and separating the copper matte from the said crude bismuth.

2. The herein disclosed process for the separation of bismuth and copper, which consists in oxidizing the bismuth copper product, consisting chiefly of bismuth and copper, reducing the same to a fine state, intimately mixing therewith a suitable compound containing combined sulfur, smelting said mixture to provide crude bismuth and copper matte, and separating the copper matte from the said crude bismuth.

3. The herein disclosed process for the separation of bismuth and copper, which consists in oxidizing the bismuth copper product, consisting chiefly of bismuth and copper, reducing the same to a fine state, intimately mixing therewith a mixture of carbon in excess and sodium sulfate in excess, smelting said mixture to provide crude bismuth and copper matte, and separating the copper matte from the said crude bismuth.

4. The herein described process for the separation of bismuth from copper, which consists in smelting a product containing the same with a suitable compound containing combined sulfur to provide crude bismuth and copper matte, separating the copper matte from said crude bismuth, oxidizing said crude bismuth, and then smelting the product with a suitable sulfur compound.

5. The herein described process for the separation of bismuth from copper, which consists in smelting a product containing the same with a suitable compound containing combined sulfur to provide bismuth and copper matte, separating the copper matte from said crude bismuth, oxidizing said crude bismuth, and then smelting the same again with a suitable sulfur compound, and finally refining said bismuth and suitably recovering the copper from the matte.

6. The herein described process for the separation of bismuth from copper, which consists in smelting a product containing the same with a suitable sulfur compound to provide crude bismuth and copper matte, separating the copper matte from said crude bismuth, oxidizing said crude bismuth, but stopping said oxidation at a point where a small portion of the same remains unoxidized, removing the said unoxidized portion with any contained unoxidized or slightly oxidized metals, and then smelting said oxidized bismuth again with a suitable sulfur compound.

7. The herein described process for the separation of bismuth from copper, which consists in smelting a product containing the same with a suitable sulfur compound by suitably heating until the boiling of the melted mass has ceased, lowering the temperature and removing the slags, further cooling the melted mass and then removing the copper matte formed, raising the temperature of the melted mass of bismuth and casting the same into suitable anodes, and finally refining said anodes of bismuth electrolytically.

8. The herein described process for the separation of bismuth from copper, which consists in smelting a product containing the same with a suitable sulfur compound by suitably heating until the boiling of the melted mass has ceased, lowering the temperature and removing the slags, further cooling the melted mass and then removing the copper matte formed, raising and maintaining the temperature at such a point as to keep the mass of melted bismuth in a liquid state, and suitably removing the same.

Signed at Hammond, in the county of Lake and State of Indiana, this 14th day of Sept. A. D. 1910.

WILLIAM THUM.

Witnesses:
 JOHN N. BECKMAN,
 C. H. MOLTERS.

Copies of this patent may be obtained for five cents each, by addressing the "Commissioner of Patents, Washington, D. C."